E. L. RUSSELL.
VALVE ADJUSTER AND DRIVER.
APPLICATION FILED MAY 4, 1912. RENEWED FEB. 8, 1915.
1,153,711.
Patented Sept. 14, 1915.
2 SHEETS—SHEET 1.
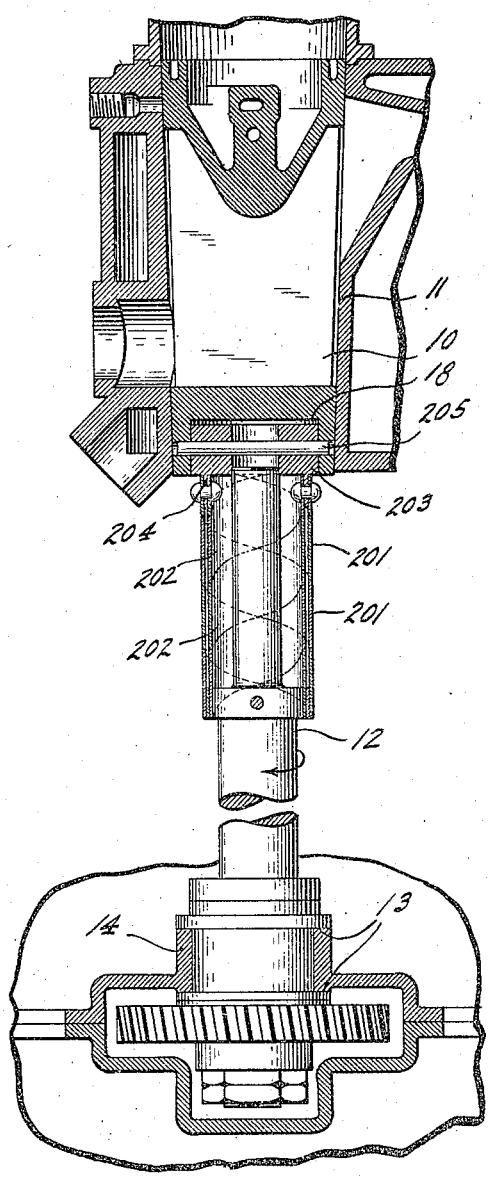
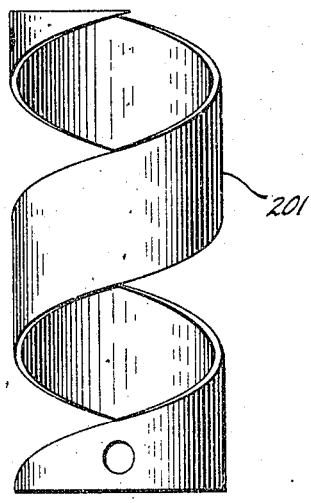
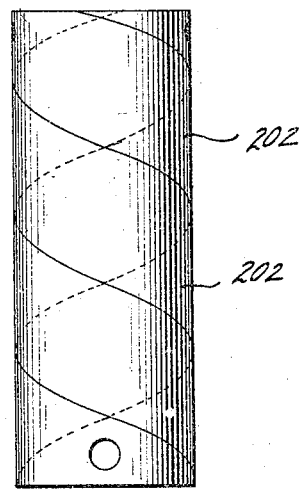
Witnesses
Frank A. Pahl
May Layden
Inventor
Edwin L. Russell,
By Arthur M. Hood.
Attorney E. L. RUSSELL.
VALVE ADJUSTER AND DRIVER.
APPLICATION FILED MAY 4, 1912. RENEWED FEB. 8, 1915.
1,153,711.
Patented Sept. 14, 1915.
2 SHEETS—SHEET 2.
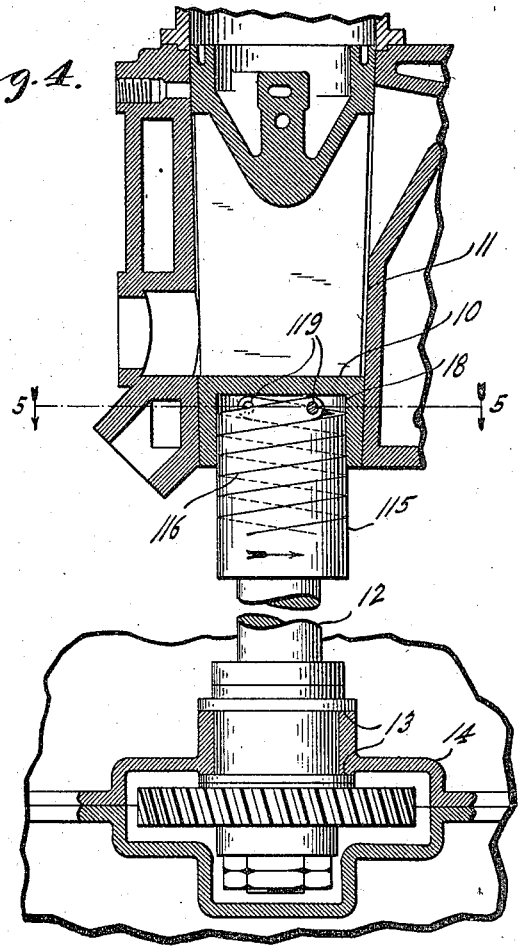
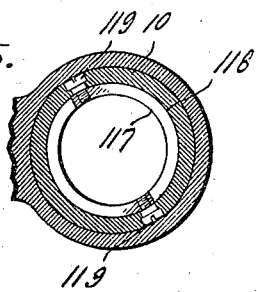

UNITED STATES PATENT OFFICE.

EDWIN L. RUSSELL, OF DETROIT, MICHIGAN.

VALVE ADJUSTER AND DRIVER.

1,153,711.  Specification of Letters Patent.  Patented Sept. 14, 1915.

Application filed May 4, 1912, Serial No. 695,213. Renewed February 8, 1915. Serial No. 6,805.

*To all whom it may concern:*

Be it known that I, EDWIN L. RUSSELL, a citizen of the United States, residing at Detroit, in the county of Wayne and State of Michigan, have invented a new and useful Valve Adjuster and Driver, of which the following is a specification.

The object of my invention is to produce a driving connection between a valve, or other seated member, and its driving member, by means of which, upon undue resistance of the valve to movement along its seat, the driving connection will automatically operate to permit a slight forward movement of the driving member relative to the valve and, by reason of such movement, to thereby operate upon the valve in such manner as to lift, or relieve, from its seat enough to diminish the resistance of the valve to movement along its seat by an amount sufficient to permit the valve to thereupon be shifted along its seat and to resume its normal relationship to the driving member.

The accompanying drawings illustrate that form of my invention which is particularly designed for use where the seated member and the driving member are rotary and substantially coaxial.

Figure 1 is an axial section of an embodiment of my invention of such form as to operate with equal facility, and in the same manner, in either direction of rotation of the driving member; Fig. 2 is a side elevation of one of the righthand helices forming a part of the driving connection; Fig. 3 a side elevation of the two lefthand helices in their nested relationship; Fig. 4 is a section similar to Fig. 1 showing a slight modification in which only one set of helices is utilized; Fig. 5 a section on line 5—5 of Fig. 4.

In both Figs. 1 and 4, 10 indicates an axially tapered rotary valve seated in a correspondingly tapered casing or seat 11, but it will be understood that the type of valve and associated seat may be variously changed without departing from my invention. In this form of the invention the valve is to be driven rotatively by a shaft 12 which is arranged in substantial alinement with the valve and is held against axial movement by any suitable means, such, for instance, as flanges 13 and a casing 14.

In the construction illustrated in Figs. 1, 2 and 3 I form a tube of two nested helices 201, 201, these helices having a righthand pitch. I also provide a tube formed of two nested helices 202, 202 which have a lefthand pitch conveniently the same, as to amount, as the pitch of the helices 201. The two tubes thus formed are of sufficiently different diameters to permit one to be sleeved within the other with a limited space between the two and the lower ends of the two tubes are anchored to shaft 12 while the upper ends are anchored to the valve 10, the two tubes being substantially coaxial with the valve and driving shaft. For convenience in manufacture, I find that the upper ends of the tubes may be anchored to a plug 203 provided with a thin depending annular flange 204 which lies between and serves to space the upper ends of the two tubes. Plug 203 is then connected to valve 10 in any suitable manner as by being seated within a pocket 18 formed in the valve and the plug held in place by a cross pin 205.

The helices 201 and 202 are made of such material as to form springs having resilience both axially and radially. When the parts are assembled the shaft 12 will be so adjusted axially that the axial spring force of the helices will act upon the valve 10 to hold it into or upon its seat although, in so adjusting the shaft 12, I think it preferable not to materially separate the convolutions of the helices.

If shaft 12 be rotated in the direction indicated by the arrow in Fig. 1, the outer helices 201 will be put under tension and the inner helices 202 will be put under compression. Rotation of the shaft in the opposite direction will, of course, reverse the stresses in the two pairs of helices and in either direction of rotation of the shaft the valve will be primarily driven by those helices which are under tension rather than those which are under compression. I have, therefore, found in practice that the helices may be conveniently formed of comparatively thin steel tubing, say about one-sixteenth of an inch in thickness, and each helix should, so far as I now know, comprise about two and one-half turns.

Whenever the valve 10 offers too great a resistance to movement along its seat (*i. e.*, rotative movement) the lower turns of the helices under tension will slip beneath the superposed turns and [both by a cam action and also because of the resultant decrease of diameter at the middle (of the tube formed by the helices) and the consequent increase of length] will drive the valve upwardly away from its seat until it is relieved therefrom, whereupon the resilience of the helices will advance the valve into its proper and normal relationship with the shaft.

The axial movement of the valve is, in most instances, so small as to be almost invisible but there is, nevertheless, under all conditions an initial decrease of force acting axially upon the valve to hold it to its seat and, if this mere decrease is not sufficient there will, of course, come a time, whenever there is a forward advancement of the shaft independent of the valve, when the cam action of the convolutions of the helices upon each other will actually increase the axial length of the tubes and thus force the valve positively from its seat. It will be noticed that the action above described will take place in either direction of movement of the shaft 12 and the mechanism is therefore specially applicable for use in driving rotary valves for gas engines, air compressors, etc., as the driving mechanism can be given very great axial stiffness, to withstand any effect of the exploded gases tending to lift the valve from its seat without, however, actively operating upon the valve to drive it to its seat with such force as to cause undue wear or unnecessary sticking.

The form shown in Figs. 4 and 5 is very similar to the form already described but comprises only one set of helices 116 which are shown as being formed by helically slitting a tube 115 into two helical and nested spring fingers which, after formation are compressed axially so as to be closely nested. The tube 115 is anchored to shaft 112 and the ends of the spring fingers are anchored at 119 to valve 10 within pocket 18. In this form of the device the fingers 116 are necessarily thicker than in the other form so that they may have a sufficient amount of rigidity to transmit a thrust through the fingers to the valve. The normal direction of rotation of shaft 12 will be indicated by the arrow in Fig. 4 and when the shaft is so rotated, if the valve 10 offers undue resistance to rotation, there will be a slight advancement of the shaft 12 relative to the valve, thus causing the shaft ends of the helices to be moved forwardly and slide beneath the adjacent convolutions. This action not only produces an axial elongation of the helices by the cam action of the interengaging convolutions but also causes a reduction of diameter of the tube at the middle of its length, thus operating to axially elongate the tube or helices. If there should be a reversal of rotation of the shaft 12, there should be a yielding connection between the shaft and the power. It is to be understood, however, that the lifting of the valve from its seat, in either direction of rotation of the shaft does not take place unless there is abnormal resistance of the valve movement along its seat.

In the form shown in Fig. 1, it is convenient to provide the shaft 12 with an upwardly extended portion which projects into the bore of the plug 205.

I claim as my invention:

1. The combination of a seat member, a seated member associated rotatably therewith, an axially fixed rotatable driving shaft, and a driving connection between the shaft and seated member comprising two oppositely pitched helical spring members, the turns of each of said members being closely associated and each of said members being secured at one end to the driver and at the other end to the seated member, the adjacent helical faces coacting to lift the valve from its seat.

2. The combination of a seat member, a seated member associated rotatably therewith, an axially fixed rotatable driving shaft, and a driving connection between the shaft and seated member comprising two oppositely pitched helical spring members, each of said spring members comprising a plurality of closely nested helices and each of said helices being secured at one end to the driver and at the other end to the seated member, the adjacent helical faces coacting to lift the valve from its seat.

In witness whereof I have hereunto set my hand and seal at Indianapolis, Indiana, this 22nd day of April, A. D. one thousand nine hundred and twelve.

EDWIN L. RUSSELL. [L. S.]

Witnesses:
ARTHUR M. HOOD,
FRANK A. FAHLE.